United States Patent
Hoffstein et al.

(10) Patent No.: US 6,298,137 B1
(45) Date of Patent: Oct. 2, 2001

(54) RING-BASED PUBLIC KEY CRYPTOSYSTEM METHOD

(75) Inventors: Jeffrey Hoffstein; Jill Pipher, both of Pawtucket, RI (US); Joseph H. Silverman, Needham, MA (US)

(73) Assignee: NTRU Cryptosystems, Inc., Burlington, MA (US)

( * ) Notice: Subject to any disclaimer, the term of this patent is extended or adjusted under 35 U.S.C. 154(b) by 0 days.

(21) Appl. No.: 09/543,708

(22) Filed: Apr. 5, 2000

Related U.S. Application Data

(62) Division of application No. 08/914,449, filed on Aug. 19, 1997, now Pat. No. 6,081,597.
(60) Provisional application No. 60/024,133, filed on Aug. 19, 1996.

(51) Int. Cl.⁷ ............... H04L 9/30; H04L 9/28; H04L 9/08
(52) U.S. Cl. ................. 380/30; 380/28; 380/283
(58) Field of Search ................. 380/28, 30, 44, 380/278, 283, 286

(56) References Cited

U.S. PATENT DOCUMENTS

| | | | |
|---|---|---|---|
| 4,218,582 | 8/1980 | Hellman et al. | 178/22 |
| 4,405,829 | 9/1983 | Rivest et al. | 178/22.1 |
| 4,633,036 | 12/1986 | Hellman et al. | 178/22.11 |
| 4,995,082 | 2/1991 | Schnorr | 380/23 |
| 5,054,066 | 10/1991 | Riek et al. | 380/28 |
| 5,231,668 | 7/1993 | Kravitz | 380/28 |
| 5,276,737 | 1/1994 | Micali | 380/30 |
| 5,299,262 | 3/1994 | Brickell et al. | 380/28 |
| 5,351,297 | 9/1994 | Miyaji et al. | 380/28 |
| 5,375,170 | 12/1994 | Shamir | 380/30 |
| 5,577,124 | 11/1996 | Anshel et al. | 380/46 |

(List continued on next page.)

FOREIGN PATENT DOCUMENTS

95/04417 * 2/1995 (WO) ............... H04L/9/32

OTHER PUBLICATIONS

Blum, M., Goldwasser, S., "An efficient Probabilistic Public–Key Encryption Scheme Which Hides all Partial Information," Advances in Cryptology: Proceedings of CRYPTO 84, Lecture Notes in Computer Science, vol. 196, Springer–Verlag, 1985, pp. 289–299.

(List continued on next page.)

*Primary Examiner*—Tod Swann
*Assistant Examiner*—Justin T. Darrow
(74) *Attorney, Agent, or Firm*—Martin Novack

(57) ABSTRACT

A method of communicating information between users of a communications system includes the following steps: generating a ring R, ideals P and Q in R, a set of coset representatives $C_Q$ for the ring R modulo the ideal Q, and a set of coset representatives $C_p$ for the ring R modulo the ideal P; generating at least one public key element $h_1, \ldots, h_k$ in the ring R as a function of at least two private key elements $f_1, \ldots f_n$ in R and the ideal Q of the first user; and transmitting from a first user to a second user a description of the ring R, the ideal Q, the ideal P, and the elements $h_1, \ldots, h_k$ in R; generating an element e in R as a function of the ideals P and Q, the public key elements $h_1, \ldots, h_k$, a private message element m in R, and at least one private random element $\phi_1, \ldots, \phi_l$ of the second user; and transmitting the element e from the second user to the first user, such that the first user can determine the message element m by computing a result A in R of evaluating a function F of e, $f_1, \ldots, f_n$, computing a coset representative a of A in the set of coset representatives $C_q$, computing a result B of evaluating a function G of a, $f_1, \ldots, f_n$, computing a coset representative b of B in the set of coset representatives $C_p$, and computing a result c in the set of coset representatives $C_p$ of evaluating a function H of b, $f_1, \ldots, f_n$.

25 Claims, 8 Drawing Sheets

U.S. PATENT DOCUMENTS

| | | | |
|---|---|---|---|
| 5,600,725 | | 2/1997 | Rueppel et al. ........................ 380/30 |
| 5,625,692 | | 4/1997 | Herzberg et al. ...................... 380/21 |
| 5,696,827 | * | 12/1997 | Brands ................................... 380/30 |
| 5,790,675 | | 8/1998 | Patarin .................................. 380/23 |
| 5,799,088 | * | 8/1998 | Raike .................................... 380/30 |
| 5,805,703 | | 9/1998 | Crandal ................................. 380/30 |

OTHER PUBLICATIONS

Coppersmith, D., Shamir, A., "Lattice Attacks on NTRU," preprint, Apr. 5, 1997, presented at Eurocrypt 97, pp. 1–13.

Goldreich, O., Goldwasser, S., Halevi, S., "Public–Key Cryptosystems From Lattice Reduction Problems," MIT-Laboratory for Computer Science preprint, Nov. 1996, pp. 0–29.

Hoffstein, J., Pipher, J., Silverman, J.H., "NTRU: A Ring-Based Public Key Cryptosystem," preprint, presented at the rump session of Crypto 96, pp. I–1–I–18.

Schnorr, C.P., Hoerner, H.H., "Attacking the Chor Rivest Cryptosystem by Improved Lattice Reduction," Proc. EUROCRYPT 1995, Lecture Notes in Computer Science, vol. 921, Springer–Verlag, 1995, pp 1–12.

Stinson, D., "Crytography: Theory and Practice," CRC Press, Boca Raton, 1995, pp. 114–203.

Goldwasser, S., Micali, S., "Probabilistic Encryption" J. Computer and Systems Science, vol. 28, (1984) pp 270–299.

McEliece, R.J., "A Public–Key Cryptosystem Based on Algebraic Coding Theory," JPL Pasadena, DSN Progress Reports, vol. 42–44 (1978) pp. 114–116.

* cited by examiner

RING-BASED PUBLIC KEY CRYPTOSYSTEM METHOD

RELATED APPLICATION

This is a divisional of U.S. application Ser. No. 08/914, 449 filed Aug. 19, 1997, now U.S. Pat. No. 6,081,597 which claims priority from U.S. Provisional Patent Application No. 60/024,133 filed Aug. 19, 1996.

This application claims priority from U.S. Provisional Patent Application No. 60/024,133, filed Aug. 19, 1996, and said Provisional Patent Application is incorporated herein by reference.

FIELD OF THE INVENTION

This invention relates to encoding and decoding of information and, more particularly, to a public key cryptosystem for encryption and decryption of digital messages by processor systems.

BACKGROUND OF THE INVENTION

Secure exchange of data between two parties, for example, between two computers, requires encryption. There are two general methods of encryption in use today, private key encryption and public key encryption. In private key encryption, the two parties privately exchange the keys to be used for encoding and decoding. A widely used example of a private key cryptosystem is DES, the Data Encryption Standard. Such systems can be very fast and very secure, but they suffer the disadvantage that the two parties must exchange their keys privately.

A public key cryptosystem is one in which each party can publish their encoding process without compromising the security of the decoding process. The encoding process is popularly called a trap-door function. Public key cryptosystems, although generally slower than private key cryptosystems, are used for transmitting small amounts of data, such as credit card numbers, and also to transmit a private key which is then used for private key encoding.

Heretofore a variety of trap-door functions have been proposed and implemented for public key cryptosystems.

One type of trap-door function which has been used to create public key cryptosystems involves exponentiation in a group; that is, taking an element of a group and repeatedly multiplying the element by itself using the group operation. The group most often chosen is the multiplicative group modulo pq for large prime numbers p and q, although other groups such as elliptic curves, abelian varieties, and even non-commutative matrix groups, have been described. However, this type of trap-door function requires large prime numbers, on the order of 100 digits each, making key creation cumbersome; and the exponentiation process used for encoding and decoding is computationally intensive, requiring many multiplications of hundred digit numbers and on the order of $N^3$ operations to encode or decode a message consisting of N bits.

A second type of trap-door function which has been used to create public key cryptosystems is based on the difficulty of determining which numbers are squares in a group, usually the multiplicative group modulo pq for large primes p and q. Just as in the first type, key creation is cumbersome and encoding and decoding are computationally intensive, requiring on the order of $N^3$ operations to encode or decode a message consisting of N bits.

A third type of trap-door function involves the discrete logarithm problem in a group, generally the multiplicative group or an elliptic curve modulo a large prime p. Again, key creation is cumbersome, since the prime p needs at least 150 digits and p−1 must have a large prime factor; and such systems use exponentiation, so again require on the order of $N^3$ operations to encode or decode a message consisting of N bits.

A fourth type of trap-door function which has been used to create public key cryptosystems is based on the knapsack, or subset sum, problem. These functions use a semigroup, normally the semigroup of positive integers under addition. Many public key cryptosystems of this type have been broken using lattice reduction techniques, so they are no longer considered secure systems.

A fifth type of trap-door function which has been used to create public key cryptosystems is based on error correcting codes, especially Goppa codes. These cryptosystems use linear algebra over a finite field, generally the field with two elements. There are linear algebra attacks on these cryptosystems, so the key for a secure cryptosystem is a large rectangular matrix, on the order of 400,000 bits. This is too large for most applications.

A sixth type of trap-door function which has been used to create public key cryptosystems is based on the difficulty of finding extremely short basis vectors in a lattice of large dimension N. The keys for such a system have length on the order of $N^2$ bits, which is too large for many applications. In addition, these lattice reduction public key cryptosystems are very new, so their security has not yet been fully analyzed.

Most users, therefore, would find it desirable to have a public key cryptosystem which combines relatively short, easily created keys with relatively high speed encoding and decoding processes.

It is among the objects of the invention to provide a public key encryption system for which keys are relatively short and easily created and for which the encoding and decoding processes can be performed rapidly. It is also among the objects hereof to provide a public key encryption system which has relatively low memory requirements and which depends on a variety of parameters that permit substantial flexibility in balancing security level, key length, encoding and decoding speed, memory requirements, and bandwidth.

SUMMARY OF THE INVENTION

The invention allows keys to be chosen essentially at random from a large set of vectors, with key lengths comparable to the key lengths in other common public key cryptosystems, and features an appropriate (e.g. $\approx 2^{80}$ for current circumstances) security level, and provides encoding and decoding processes which are between one and two orders of magnitude faster than the most widely used public key cryptosystem, namely the exponentiation cryptosystem referenced above.

The encoding technique of an embodiment of the public key cryptosystem hereof uses a mixing system based on polynomial algebra and reduction modulo two numbers, p and q, while the decoding technique uses an unmixing system whose validity depends on elementary probability theory. The security of the public key cryptosystem hereof comes from the interaction of the polynomial mixing system with the independence of reduction modulo p and q. Security also relies on the experimentally observed fact that for most lattices, it is very difficult to find the shortest vector if there are a large number of vectors which are only moderately longer than the shortest vector.

An embodiment of the invention is in the form of a method for encoding and decoding a digital message m, comprising the following steps: selecting ideals p and q of a ring R; generating elements f and g of the ring R, and generating element $F_q$ which is an inverse of f (mod q), and generating element $F_p$ which is an inverse of f (mod p); producing a public key that includes h, where h is congruent, mod q, to a product that can be derived using g and $F_q$; producing a private key from which f and $F_p$ can be derived; producing an encoded message e by encoding the message m using the public key and a random element ø; and producing a decoded message by decoding the encoded message e using the private key.

Further features and advantages of the invention will become more readily apparent from the following detailed description when taken in conjunction with the accompanying drawings.

DETAILED DESCRIPTION

Figure 1:
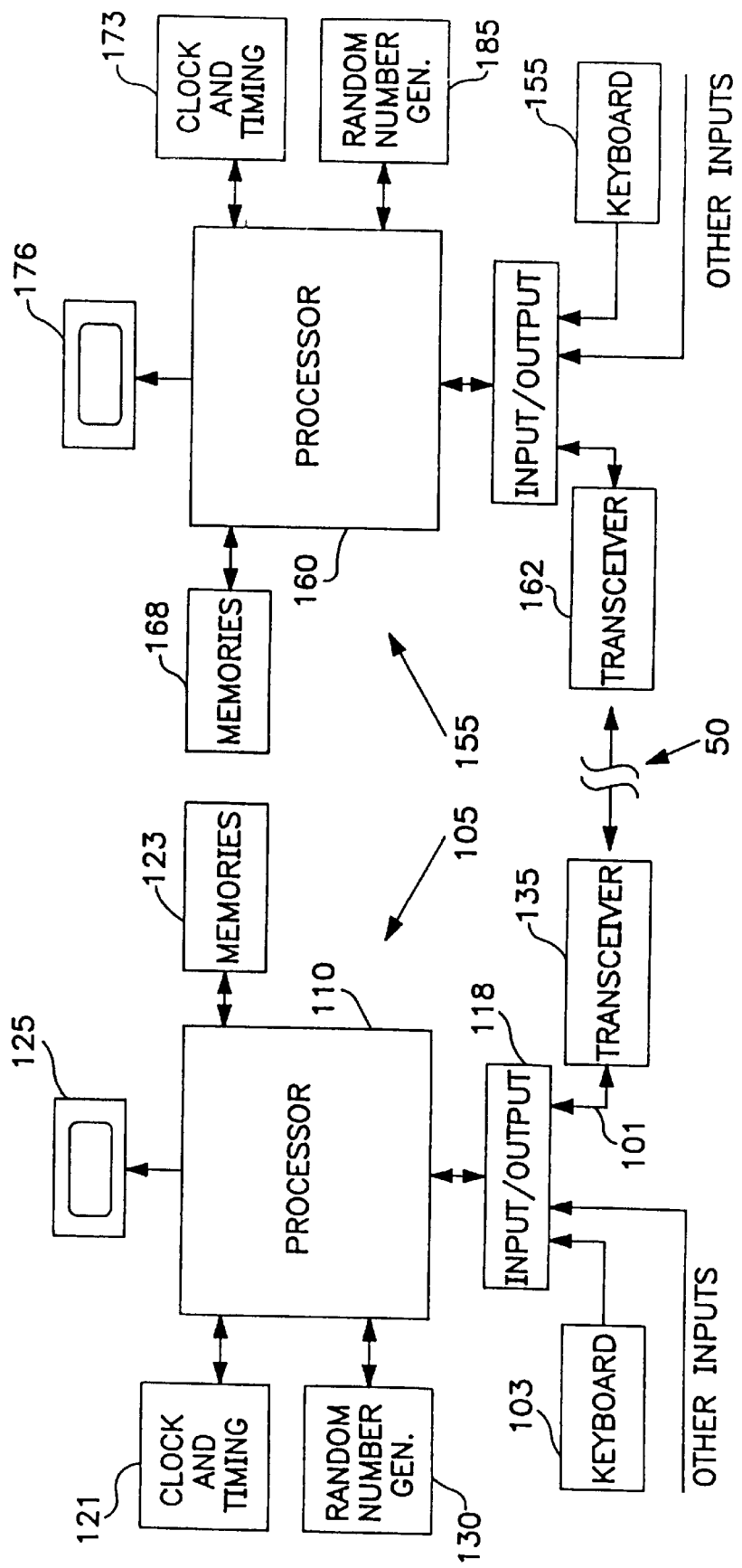
FIG. 1 is a block diagram of a system that can be used in practicing embodiments of the invention.

FIG. 1 is a block diagram of a system that can be used in practicing embodiments of the invention. Two processor-based subsystems 105 and 155 are shown as being in communication over an insecure channel 50, which may be, for example, any wired or wireless communication channel such as a telephone or internet communication channel. The subsystem 105 includes processor 110 and the subsystem 155 includes processor 160. When programmed in the manner to be described, the processors 110 and 160 and their associated circuits can be used to implement an embodiment of the invention and to practice an embodiment of the method of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The processors may be, for example, Intel Pentium processors. The subsystem 105 will typically include memories 123, clock and timing circuitry 121, input/output functions 118 and monitor 125, which may all be of conventional types. Inputs can include a keyboard input as represented at 103. Communication is via transceiver 135, which may comprise a modem or any suitable device for communicating signals.

The subsystem 155 in this illustrative embodiment can have a similar configuration to that of subsystem 105. The processor 160 has associated input/output circuitry 164, memories 168, clock and timing circuitry 173, and a monitor 176. Inputs include a keyboard 155. Communication of subsystem 155 with the outside world is via transceiver 162 which, again, may comprise a modem or any suitable device for communicating signals.

The encoding technique of an embodiment of the public key cryptosystem hereof uses a mixing system based on polynomial algebra and reduction modulo two numbers, p and q, while the decoding technique uses an unmixing system whose validity depends on elementary probability theory. [It will be understood that the polynomial is a convenient representation of ordered coefficients (a polynomial of degree N−1 having N ordered coefficients, some of which may be zero), and that the processor will perform designated operations on coefficients.] The security of the public key cryptosystem hereof comes from the interaction of the polynomial mixing system with the independence of reduction modulo p and q. Security also relies on the experimentally observed fact that for most lattices, it is very difficult to find the shortest vector if there are a large number of vectors which are only moderately longer than the shortest vector.

The cryptosystem hereof fits into the general framework of a probabilistic cryptosystem as described in M. Blum et al., "An Efficient Probabilistic Public-Key Encryption Scheme Which Hides All Partial Information", Advances in Cryptology: Proceedings of CRYPTO 84, Lecture Notes in Computer Science, Vol. 196, Springer-Verlag, 1985, pp. 289–299; and S. Goldwasser et al., "Probabilistic Encryption", J. Computer and Systems Science 28 (1984), 270–299. This means that encryption includes a random element, so each message has many possible encryptions. Encoding and decoding and key creation are relatively fast and easy using the technique hereof, in which it takes $O(N^2)$ operations to encode or decode a message block of length N, making it considerably faster than the $O(N^3)$ operations required by RSA. Key lengths are O(N), which compares well with the $O(N^2)$ key lengths required by other "fast" public keys systems such as those described in R. J. McEliece, "A Public-Key Cryptosystem Based On Algebraic Coding Theory", JPL Pasadena, DSN Progress Reports 42–44 (1978), 114–116 and O. Goldreich et al. "Public-Key Cryptosystems From Lattice Reduction Problems", MIT—Laboratory for Computer Science preprint, November 1996.

An embodiment of the cryptosystem hereof depends on four integer parameters (N,K,p,q) and three sets $\mathcal{L}_q$, $\mathcal{L}_\phi$, $\mathcal{L}_m$ of polynomials of degree N−1 with integer coefficients. This embodiment works in the ring $R=Z[X]/(X^N-1)$. An element F ∈ R will be written as a polynomial or a vector, $$F = \sum_{i=1}^{N} F_i x^{N-i} = [F_1, F_2, \ldots, F_N].$$

The star "★" denotes multiplication in R. This star multiplication is given explicitly as a cyclic convolution product, F★G=H with $$H_k = \sum_{i=1}^{k-1} F_i G_{k-i} + \sum_{j=k}^{N} F_i G_{N+k-i} = \sum_{i+j \equiv k \pmod{N}} F_i G_j.$$

When a multiplication modulo (say) q is performed, the coefficients are reduced modulo q. Further reference can be made to Appendix 1.

The following is an example of an embodiment in accordance with the invention of a public key cryptosystem. Very small numbers are used for ease of illustration, so the example would not be cryptographically secure. In conjunction with the example there is described, as material in double brackets ([[ ]]), operating parameters that would provide a practical cryptographically secure cryptosystem under current conditions. Further discussion of the operating parameters to achieve a particular level of security is set forth in Appendix 1, which also describes the degree of immunity of an embodiment of the cryptosystem hereof to various types of attack.

The objects used in an embodiment hereof are polynomials of degree N−1, $$a_1 x^{N-1} + a_2 x^{N-2} + \ldots + a_{N-1} x + a_N,$$

where the coefficients $a_1, \ldots, a_N$ are integers. In the "star" multiplication hereof, $x^N$ is replaced by 1, and $x^{N+1}$ is replaced by x, and $x^{N-2}$ is replaced by $x^2$, and so on. [A polynomial may also be represented by an N-tuple of numbers $$[a_1, a_2, \ldots, a_N].$$

In such case the star product is also known as the convolution product. For large values of N, it may be faster to compute convolution products using the method of Fast Fourier Transforms, which take on the order of NlogN steps instead of $N^2$ steps.] For example, taking N=5, and two exemplary polynomials, the star multiplication gives $$(x^4 + 2x^2 - 3x + 2) \star (x^4 + 3x^3 + 5x - 1)$$

$$= 2x^8 + 3x^7 + 4x^6 + 5x^5 - 6x^4 + 16x^3 - 17x^2 + 13x - 2$$

$$\equiv 2x^3 + 3x^2 + 4x + 5x - 6x^4 + 16x^3 - 17x^2 + 13 \ x - 2$$

$$\equiv -6x^4 + 18x^3 - 14x^2 + 17x + 3$$

[[A secure system may use, for example N=167 or N=263.]] [This embodiment uses the ring of polynomials with integer coefficients modulo the ideal consisting of all multiples of $x^N - 1$. More generally, one could use polynomials modulo a different ideal; and even more generally, one could use some other ring R. For further information on rings and ideals, reference can be made, for example, to Topics in Algebra by I. N. Herstein.]

Another aspect of the present embodiment involves reducing the coefficients of a polynomial modulo an integer, such as the ideal q. This essentially means dividing each coefficient by q and replacing the coefficient with its remainder. For example, if q=128 and if some coefficient is 2377, then that coefficient would be replaced with 73, because 2377 divided by 128 equals 18, with a remainder of 73. However, it is easier to use "centered remainders." This means that if the remainder is between 0 and q/2, it is left alone, but if it is between q/2 and q, then q is subtracted from it. Accordingly, using centered reminders for q =128, 2377 would be replaced by −55, since −55≡73−128.

To indicate that this remainder process is being performed, a triple equal sign ($\equiv$) is used, along with the designation "mod q." The following is an example which combines star multiplication of two polynomials with reduction modulo 5. The answer uses centered remainders.

$$(x^4 + 2x^2 - 3x + 2) \star (x^4 + 3x^3 + 5x - 1) = -6x^4 + 18x^3 - 14x^2 + 17x + 3$$

$$\equiv -x^4 - 2x^3 + x^2 + 2x - 2 \pmod{5}.$$

In creating a public key cryptosystem in accordance with an embodiment hereof (and with the previously indicated small numbers for ease of illustration), a first step is to choose integer parameters N, K, p, and q. Take, for example N=5, K=1, p=3, q=128.

[[A secure system may use, for example, N=167, K=6, p=3, q=$2^{16}$=65536.]] Preferably, p and q will be relatively prime; that is, they will have no common factors greater than 1. A discussion of the desirability of having the ideals p and q be relatively prime is set forth in Appendix 1.
Some sets of polynomials are chosen, as follows:

$\mathcal{L}_g$={polynomials whose coefficients are −2's, −1's, 0's, 1's, and 2's}

$\mathcal{L}_\phi$={polynomials with two −1's, two 1's, and one 0 as coefficients}

$\mathcal{L}_m$={polynomials whose coefficients are −1's, 0's, and 1's}

[[A secure system may use, for example $\mathcal{L}_g$={polynomials whose coefficients lie between −177 and 177}

$\mathcal{L}_\phi$={polynomials whose coefficients are forty 1's, forty −1's, the rest 0's}

$\mathcal{L}_m$={polynomials whose coefficients lie between −3 and 3}

(Note: The polynomials have degree N−1, so for the secure parameters of the example, the polynomials have degree 166. Further, the actual message m being encoded consists of the remainders when the coefficients of m are divided by p, where in this example p=3.)]]

The set $\mathcal{L}_g$ is used to create the key for the cryptosystem, the set $\mathcal{L}_\phi$ is used for encoding messages, and the set $\mathcal{L}_m$ is the set of possible messages. For example, $2x^4 - x^3 + x - 2$ is in the set $L_g$, and $x^4 - x^3 - x^2 + 1$ is in the set $\mathcal{L}_\phi$ To implement the key creation of this example, the key creator, call him Dan, chooses two polynomials f and g from the set $\mathcal{L}_g$. In this simplified example K=1, so there is one polynomial g. Suppose that Dan chooses $f = x^4 - x^3 + 2x^2 - 2x + 1,$ $g = x^4 - x^3 + x^2 - 2x + 2.$

[[A secure system may use, for example, K+1 polynomials f, $g_1, \ldots, g_k \in \mathcal{L}_g$ with K=6.]]

A requirement hereof is that f must have an inverse modulo q and an inverse modulo p. What this means is that there must be polynomials $F_q$ and $F_p$ so that $F_q \star f \equiv 1 \pmod{q}$ and $F_p \star f \equiv 1 \pmod{p}$.

The well known Euclidean algorithm can be used to compute $F_q$ and $F_p$. Reference can be made, for example, to Appendix II hereof. (Some f's may not have inverses, in which case Dan would have to go back and choose another f.) For the above example f, we have $F_q=103x^4+29x^3+116x^2+79x+58$, $F_p=2x^4+2x$.

To check that this is the right $F_q$ for f, one can multiply $F_q \star f=(103x^4+29x^3+116x^2+79x+58)\star(x^4-x^3+2x^2-2x+1)$ $=256x^4+256x-127$ $\equiv 1 \pmod{128}$.

Similarly, to check that $F_p$ is correct, one can multiply $F_p \star f=(2x^4+2x)\star(x^4-x^3+2x^2-2x+1)$ $=6x^3-6x^2+6x-2$ $\equiv 1 \pmod 3$.

Now, the key creator Dan is ready to create his public key, which is the polynomial h given by $h \equiv F_q \star g \pmod q$.

[[A secure system may use, for example, K polynomials $h_1, \ldots, h_k$ given by $h_i \equiv F_q \star g_i \pmod q$ with $i=1, 2, \ldots, K$, with $K=6$.]]

Continuing with the example, Dan would compute $F_q \star g=(103x^4+29x^3+116x^2+79x+58)\star(x^4-x^3+x^2 2x+2)$ $=243x^450x^3+58x^2+232x-98$ $\equiv -13x^4-50x^3+58x^2-24x+30 \pmod{128}$.

Then Dan's public key is the polynomial $h=-13x^450x^3+58x^2-24x+30$.

Dan's private key is the pair of polynomials (f, $F_p$). In principle, the polynomial f itself can function as the private key, because $F_p$ can always be computed from f; but in practice Dan would probably want to precompute and save $F_p$.

In the next part of the example, encoding with the public key is described. Suppose the encoder, call her Cathy, wants to send Dan a message using his public key h. She chooses a message from the set of possible message $L_m$. For example, suppose that she wants to send the message $m=x^4-x^3+x^2+1$.

To encode this message, she chooses at random a polynomial ø from the set $\mathcal{L}_\varnothing$. For example, say she selects $\varnothing = -x^4+x^3-x^2+1$.

She uses this randomly chosen polynomial ø, Dan's public key h (as well as p and q, which are part of the public key), and her plaintext message m to create the encoded message e using the formula $e \equiv p\varnothing \star h+m \pmod q$.

[[A secure system may use K public keys $h_1, \ldots, h_k$, with $K=6$ for the secure example. To encode a message, Cathy can randomly choose K polynomials $\varnothing_1, \ldots, \varnothing_k$ from the set $\mathcal{L}_\varnothing$ and then create the encoded message e by computing $e \equiv p\varnothing_1 \star h_1+p\varnothing_2 \star h_2+ \ldots +p\varnothing_k \star h_k+m \pmod q$.]] An alternative would be to let h equal $pF_q \star g \pmod q$, and then the message can be encoded using the formula $e \equiv \varnothing \star h+m \pmod q$. For the present example, Cathy computes $p\varnothing \star h+m=3(-x^4+x^3-x^2+1)\star(-13x^450x^3+58x^2-24x+30)+(x^4-x^3+x^2+1)$ $=-374x^4+50x^3+196x^2-357x+487$ $\equiv 10x^4+50x^3-60x^2+27x-25 \pmod{128}$.

So Cathy's encoded message is the polynomial $e=10x^4+50x^3-60x^2+27x-25$, and she sends this encoded message to Dan.

In the next part of the example, decoding using the private key is described. In order to decode the message e, Dan first uses his private key f to compute the polynomial $a \equiv f \star e \pmod q$.

For the example being used, he computes $f * e = (x^4 - x^3 + 2x^2 - 2x + 1) * (10x^4 + 50x^3 - 60x^2 + 27x - 25)$ $= -262x^4 + 259x^3 - 124x^2 - 13x + 142$ $\equiv -6x^4 + 3x^3 + 4x^2 - 13x + 14 \pmod{128}$, $f \star e=(x^4-x^3+2x^2-2x+1)\star(10x^4+50x^3-60x^2+27x-25)$ $=-262x^4+259x^3-124x^2-13x+142$ $\equiv -6x^4+3x^3+4x^2-13x+14 \pmod{128}$, so the polynomial a is $a=-6x^4+3x^3+4x^2-13x+14$.

Next, Dan uses $F_p$, the other half of his private key, to compute $F_p \star a \pmod p$, and the result will be the decoded message. Thus for the present example, Dan computes $F_p * a = (2x^4 + 2x) * (-6x^4 + 3x^3 + 4x^2 - 13x + 14)$ $= 34x^4 - 4x^3 - 20x^2 + 36x - 38$ $\equiv x^4 - x^3 + x^2 + 1 \pmod 3$.

Reference can be made to Appendix I for further description of why the decoding works.

In a further embodiment of the invention the ring is a ring of matrices. For example, one can use the ring R=(the ring of M×M matrices with integer coefficients).

An element of R looks like $$\begin{pmatrix} a_{11} & a_{12} & \cdots & a_{1M} \\ a_{21} & a_{22} & & a_{2M} \\ \vdots & & \ddots & \vdots \\ a_{M1} & a_{M2} & \cdots & a_{MM} \end{pmatrix}$$

where the coefficients $a_{ij}$ are integers. Addition and multiplication are as usual for matrices, and it will be understood that the processor can treat the matrix members as numbers stored and operated on in any convenient manner. Let $N=M^2$, so a matrix in R has N coefficients. Relatively prime integers p and q are chosen.

In this case, to create a private key, Dan chooses K+2 matrices from R. These matrices can be called $$f, g\ w_1 W_2, \ldots, W_k.$$

These matrices should have the property that $f, g, w_1, \ldots, w_k$ have fairly small coefficients, and every $w_i$ satisfies $$w_i \equiv 0 \pmod{p}.$$

(In other words, every coefficient of every $w_i$ is a multiple of p.) To create his key, Dan needs to find inverses for f and g modulo p and q. Thus he finds matrices $F_p, F_q, G_p, G_q$ in R satisfying $$fF_p \equiv I \pmod{p}$$
$$fF_q \equiv I \pmod{p}$$
$$gG_p \equiv I \pmod{p}$$
$$gG_q \equiv I \pmod{p}$$

where I is the M×M identity matrix. In general, this is quite easy to do; and if by some chance one of the inverses fail to exist, Dan just chooses a new f or g.

Dan's public key is a list of K matrices $(h_1, h_2, \ldots, h_k)$ determined by the condition $$h_i \equiv F_q w_i G_q \pmod{q} \text{ for } i=1, 2, \ldots, K.$$

(Note that the wiIs are congruent to zero modulo p.) His private key is the four matrices $(f, g, F_p, G_p)$. In principle, f and g alone can be used as the private key, but in practice it is more efficient to precompute and store $F_p, G_p$.

The encoding for this matrix example is described next. Suppose that Cathy wants to encode a message m. The message m is a matrix with coefficients modulo p. In order to encode her message, she chooses at random some integers $\emptyset_1, \ldots, \emptyset_k$ satisfying some condition; for example, they might be chosen to be non-negative integers whose sum $\emptyset_1 + \ldots + \emptyset_k$ equals a predetermined value d. (Note that the $\emptyset_i$'s are ordinary integers, they are not matrices. Equivalently, they can be thought of as multiples of the identity matrix, so they will commute with every element of the ring R.)

Having chosen her $\emptyset_i$'s, Cathy creates her encoded message e by the rule $$e \equiv \emptyset_1 h_1 + \emptyset_2 h_2 + \ldots + \emptyset_k h_k + m \pmod{q}$$

The decoding for this matrix example is described next. We now assume that Dan has received the encoded message e and wishes to decipher it. He begins by computing the matrix a satisfying $$a \equiv feg \pmod{q}.$$

As usual, Dan chooses the coefficients of a in some restricted range, such as from $-q/2$ to $q/2$ (i.e., zero-centered coefficients), or from 0 to $q-1$.

If the parameters have been chosen appropriately, then the matrix a will be exactly equal to the sum $$a = \emptyset_1 w_1 + \emptyset_2 w_2 + \ldots \emptyset_k w_k + fmg.$$

(This will always be true modulo q, but a key point is that if q is large enough, then it will be an exact equality, not merely modulo q.) Dan's next step is to reduce a modulo p, say $$b \equiv a \pmod{p}.$$

Since all of the coefficients of the $w_i$'s are divisible by p, this means that $$b \equiv fmg \pmod{p}.$$

Finally Dan computes $$F_p b G_p \pmod{p}$$

to recover the original message m.

The described M×M matrix embodiment has excellent operating time. Encoding requires only additions and takes on the order of $M^2$ operations. Decoding requires two matrix multiplications of M×M matrices, so takes on the order of $M^3$ operations. The message length is on the order of $M^2$, so if N denotes the natural message length (i.e., $N=M^2$), then the matrix embodiment requires O(N) steps to encode and $O(N^{3/2})$ steps to decode. For comparison, the polynomial embodiment requires $O(N^2)$ steps to encode and $O(N^2)$ steps to decode, and the RSA public key system requires $O(N^3)$ steps to encode and $O(N^3)$ steps to decode.

A preliminary analysis suggests that the only natural lattice attacks on the matrix embodiment require using lattices whose dimension is $N^2+N$ (or larger). This would be a significant security improvement over the 2N dimensional lattices used to attack the polynomial embodiment.

In order to avoid brute-force (or potential meet-in-the-middle) attacks, it is necessary that the sample space for the $\emptyset_i$'s be fairly large, say between $2^{100}$ and $2^{200}$. However, this is not difficult to achieve. For example, if the oils are chosen non-negative with sum d, then the sample space has $$\binom{d+K-1}{K-1} = \frac{(d+K-1)!}{d!(K-1)!}$$

elements. So if one takes K=15 and d=1024, for example, one gets a sample space with $2^{103.8}$ elements.

The public key size is $KM^2 \log_2(q)$ bits, and the private key size is $2M^2 \log_2(pq)$ bits. Both of these are of a practical size.

Figure 2:
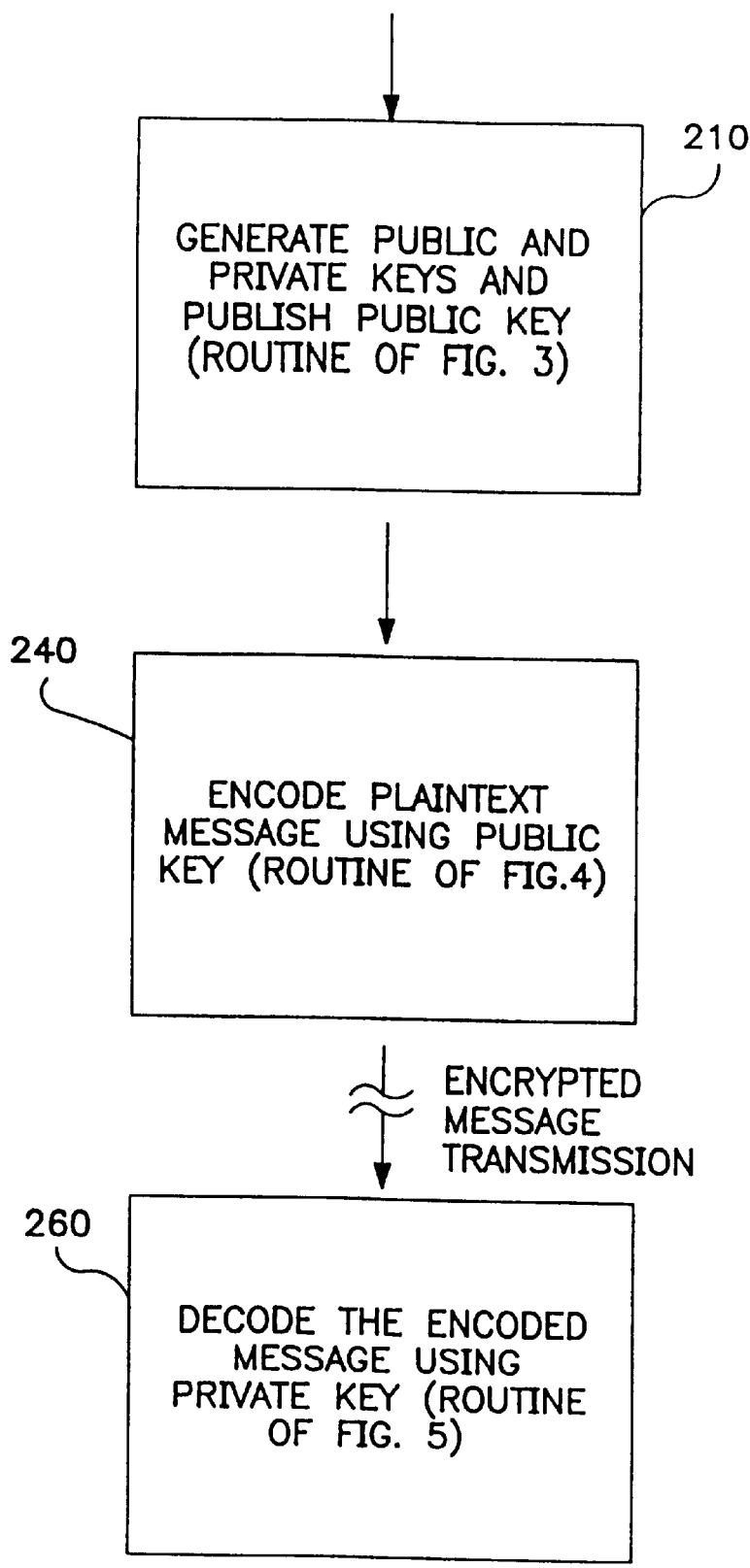
FIG. 2 is a flow diagram of a public key encryption system which, when taken with the subsidiary flow diagrams referred to therein, can be used in implementing embodiments of the invention.

FIG. 2 illustrates a basic procedure that can be utilized with a public key encryption system, and refers to routines illustrated by other referenced flow diagrams which describe features in accordance with an embodiment of the invention. The block 210 represents the generating of the public key and private key information, and the "publishing" of the public key. The routine of an embodiment hereof is described in conjunction with the flow diagram of FIG. 3. In the present example, it can be assumed that this operation is performed at the processor system 105. The public key information can be published; that is, made available to any member of the public or to any desired group from whom the private key holder desires to receive encrypted messages.

Typically, although not necessarily, the public key may be made available at a central public key library facility or website where a directory of public key holders and their public keys are maintained. In the present example, it is assumed that the user of the processor system 155 wants to send a confidential message to the user of processor system 105, and that the user of processor system 155 knows the published public key of the user E of processor system 150.

The block 220 represents the routine that can be used by the message sender (that is, in this example, the user of processor system 155) to encode the plaintext message using the public key of the intended message recipient. This routine, in accordance with an embodiment of the invention, is described in conjunction with the flow diagram of FIG. 4. The encrypted message is then transmitted over the channel 50 (FIG. 1).

The block 260 of FIG. 2 represents the routine for the decoding of the encrypted message to recover the plaintext message. In the present example, this function is performed by the user of the processor system 105, who employs the private key information. The decoding routine, for an embodiment of the invention, is described in conjunction with the flow diagram of FIG. 5.

Figure 3:
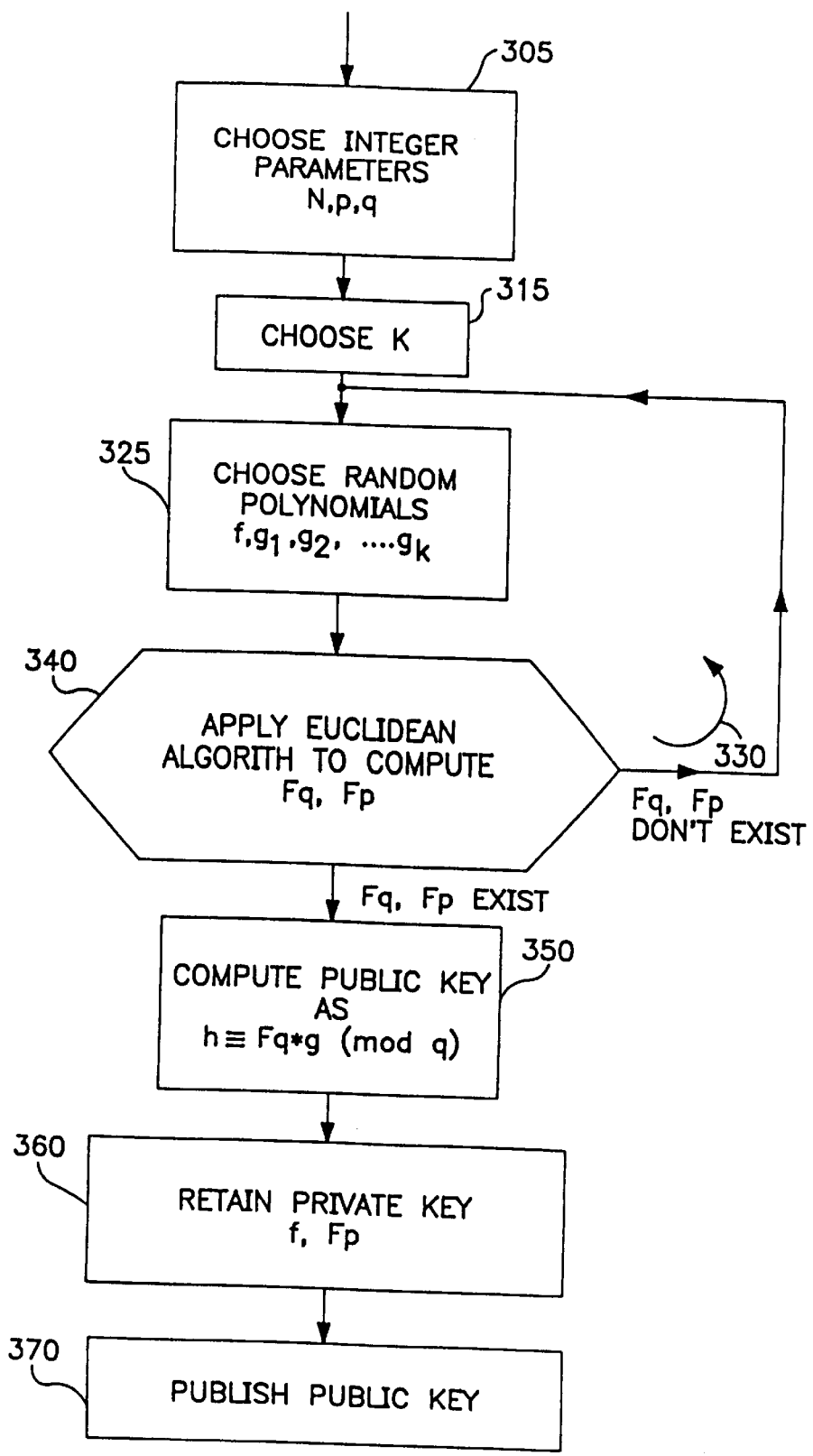
FIG. 3 is a flow diagram of a routine, in accordance with an embodiment of the invention, for generating public and private keys.

Referring now to FIG. 3, there is shown a flow diagram of the routine, as represented generally by the block 210 of FIG. 2, for generating the public and private keys. The routine can be utilized, in the present example, for programming the processor 110 of the processor system 105. The block 305 represents the choosing of integer parameters N, p, and q. As first described above, N determines the degree of the polynomials f and $g_i$ to be generated, and p and q are, respectively, the two ideals used in producing the star products. The block 315 represents the selection of K, which is the number of polynomials $g_i$ to be used. In the simplified example above, K was 1, and it was noted that a particular exemplary relatively secure system could use K=6. Next, the block 325 represents the choosing of random polynomials f, $g_1, g_2 \ldots g_k$. The coefficients may, for example, be chosen using a random number generator, which can be implemented, in known fashion, using available hardware or software. In the present embodiment, each of the processor systems is provided with a random number generator, designated by the blocks 130 and 185 respectively, in FIG. 1.

The block 340 represents application of the Euclidean algorithm to determine the inverses, $F_q$ and $F_p$, in the manner described above, for the previously selected polynomial f, if such inverses exist. If $F_p$, $F_q$ do not exist, the block 325 is re-entered, and a new polynomial f is chosen. The loop 330 is continued until polynomials are chosen for which the defined inverses can be computed. [The probability of the inverses existing for a given polynomial is relatively high, so a relatively small number of traversals through the loop 330 will generally be expected before the condition is met.] The block 350 is then entered, this block representing the computation of the public key, h in accordance with $$h = F_q \star g \pmod{q}$$

as first described above. [For K>1, there will be public key components $h_i$ for i=1, 2, . . . , K.] As represented by the block 360, the private key is retained as the polynomials f, $F_p$, and the public key can then be published, as represented by the block 370.

Figure 4:
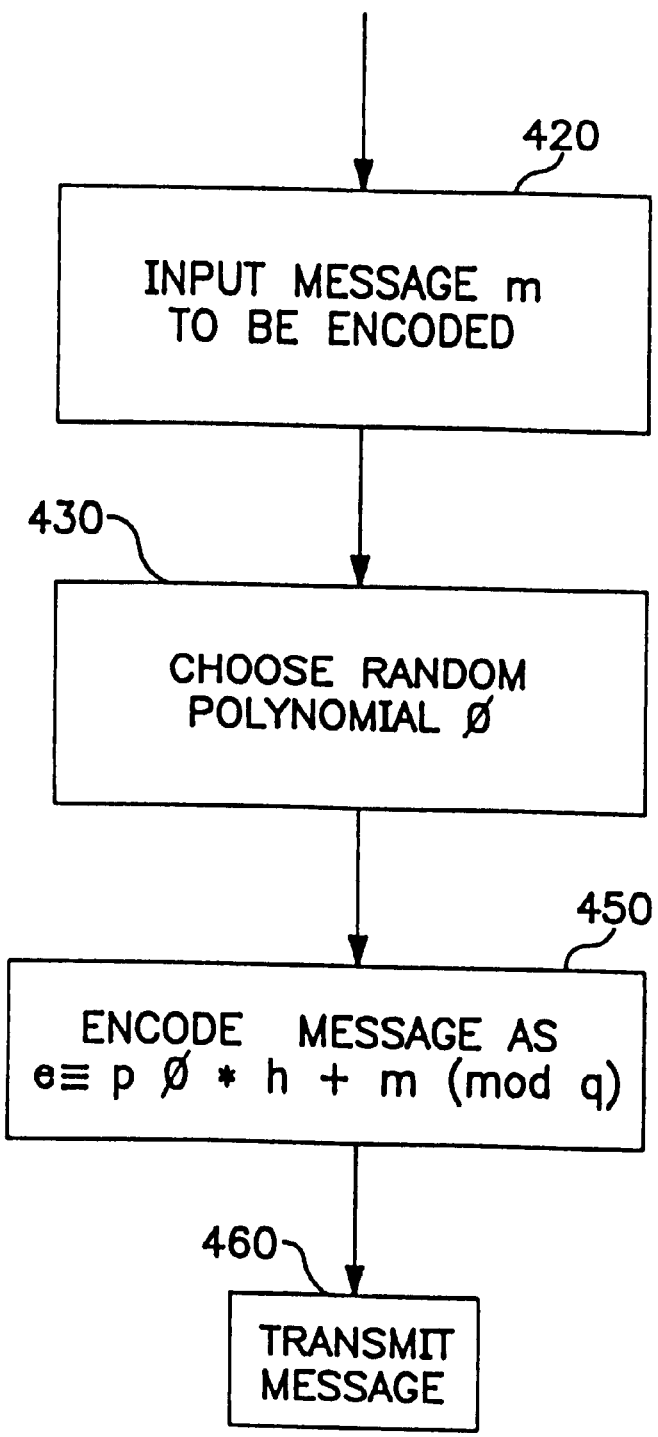
FIG. 4 is a flow diagram in accordance with an embodiment of the invention, for encoding a message using a public key.

FIG. 4 is a flow diagram, represented generally by the block 240 of FIG. 2, of a routine for programming a processor, such as the processor 160 of the processor system 155 (FIG. 1) to implement encoding of a plaintext message m. The message to be encoded is input (block 420) and a random polynomial ø is chosen (block 430). [If K>1, then K random polynomials $ø_1, ø_2, \ldots, ø_k$ are chosen.] The polynomial can be from the set $L_ø$, as described above, and the random coefficients can be selected by any hardware or software means, for example the random number generator 185. The encoded message, e, can then be computed (block 450) as $$e = pø \star h + m \pmod{q}.$$

As first noted above, for K greater than 1, the encoded message would be $e = pø_1 \star h_1 + pø_2 \star h_2 + \ldots + pø_k \star h_k + m \pmod{q}$. The encoded message can be transmitted (block 460) over channel 50 to the keyholder who, in the present example, is the user of the processor system 105.

Figure 5:
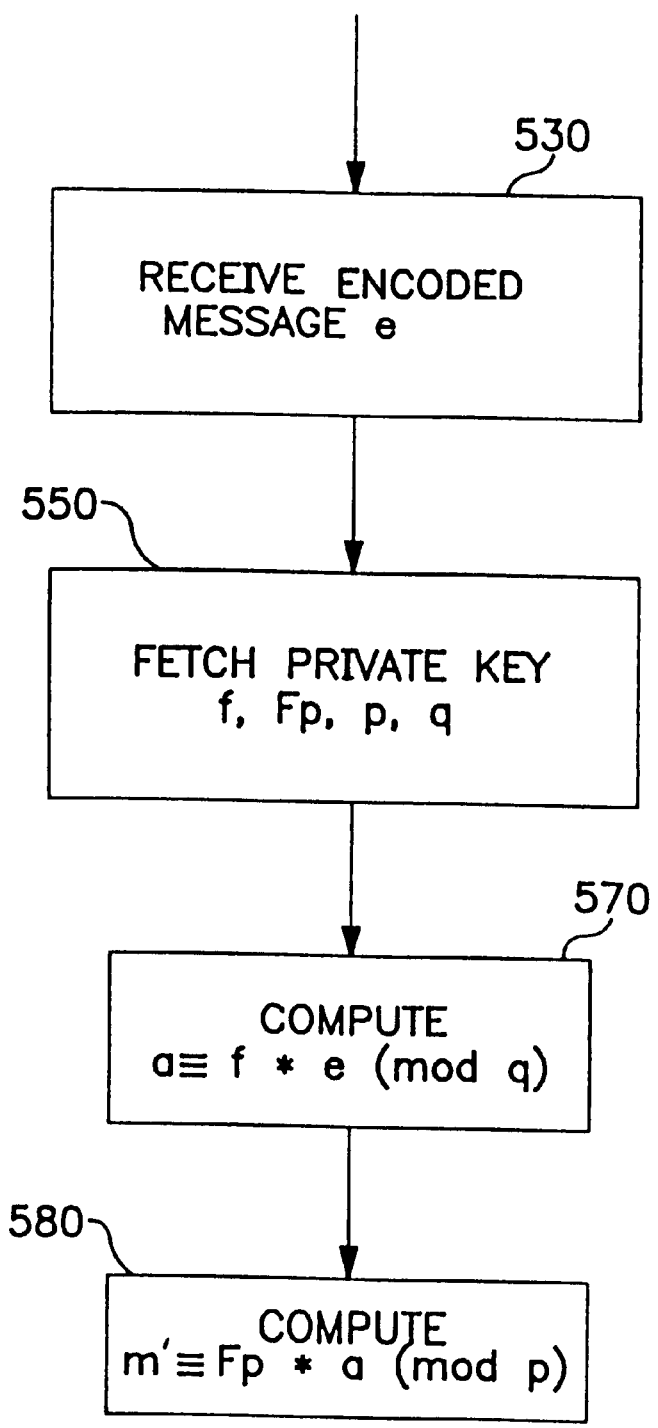
FIG. 5 is a flow diagram in accordance with an embodiment of the invention, for decoding an encoded message using a private key.

FIG. 5 is a flow diagram represented generally in FIG. 2 by the block 260, of a routine in accordance with an embodiment of the invention for decoding the encrypted message. The block 530 represents the receiving of the encrypted message, e. The retained private key information, which includes the previously defined polynomials f and $F_p$, and the integers N, p, and q, are fetched (block 550). Next, the block 570 represents the computation of $$a = f \star e \pmod{q}.$$

The decoded message, designated here as m', can then be computed (block 580) as $$m' = F_p \star a \pmod{p}.$$

Figure 6:
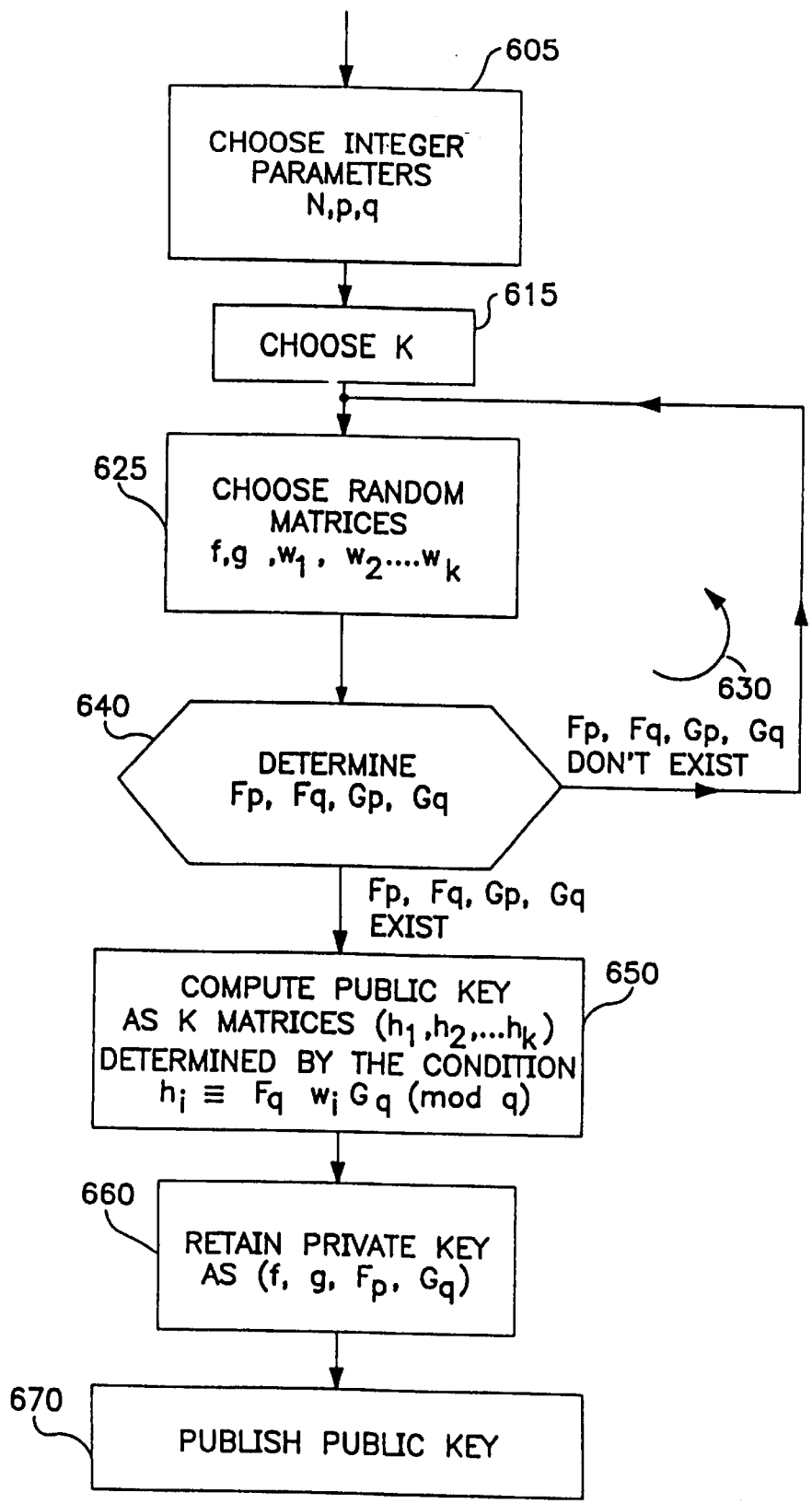
FIG. 6 is a flow diagram of a routine, in accordance with another embodiment of the invention, for generating public and private keys.
Figure 7:
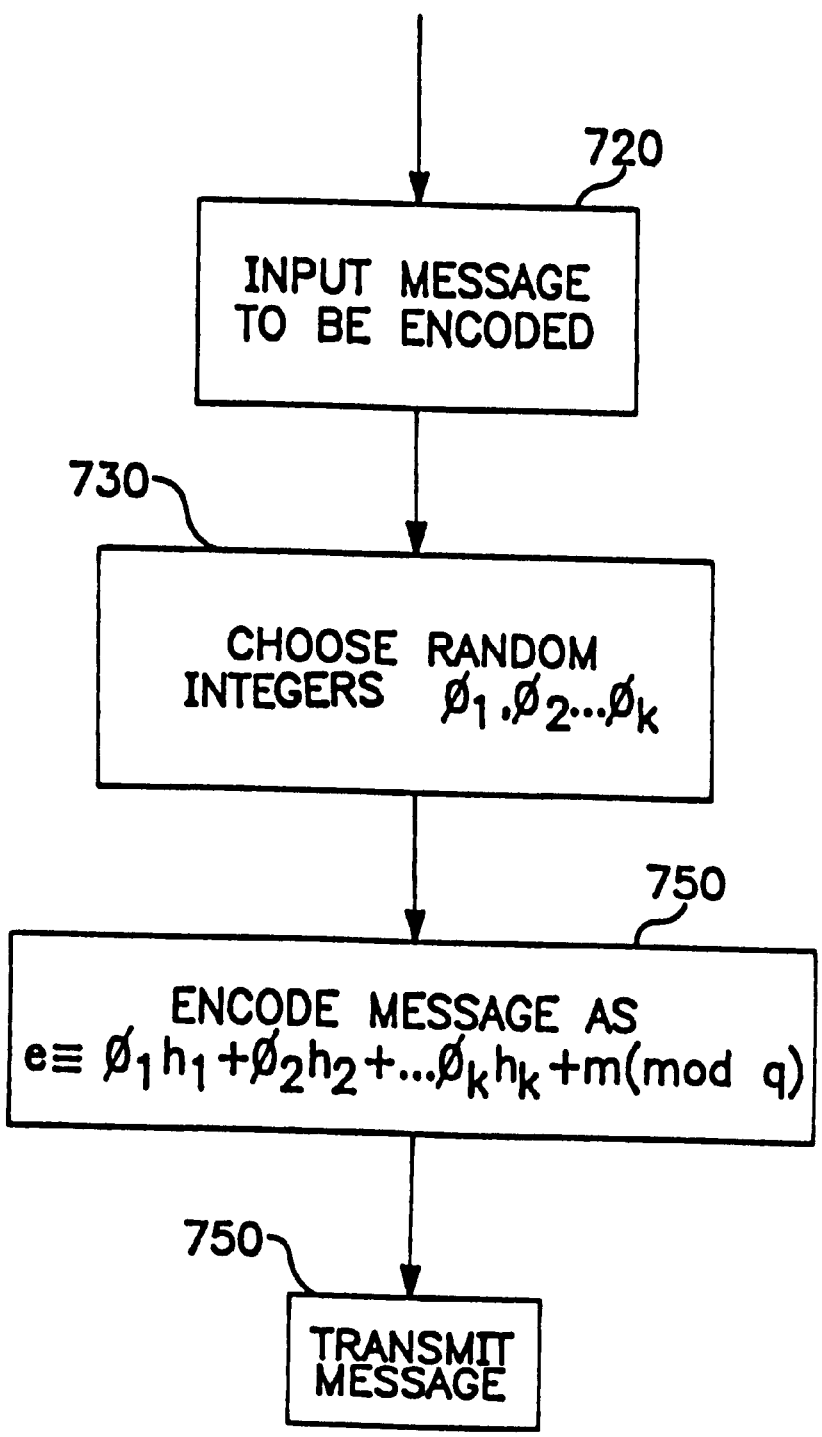
FIG. 7 is a flow diagram in accordance with another embodiment of the invention, for encoding a message using a public key.
Figure 8:
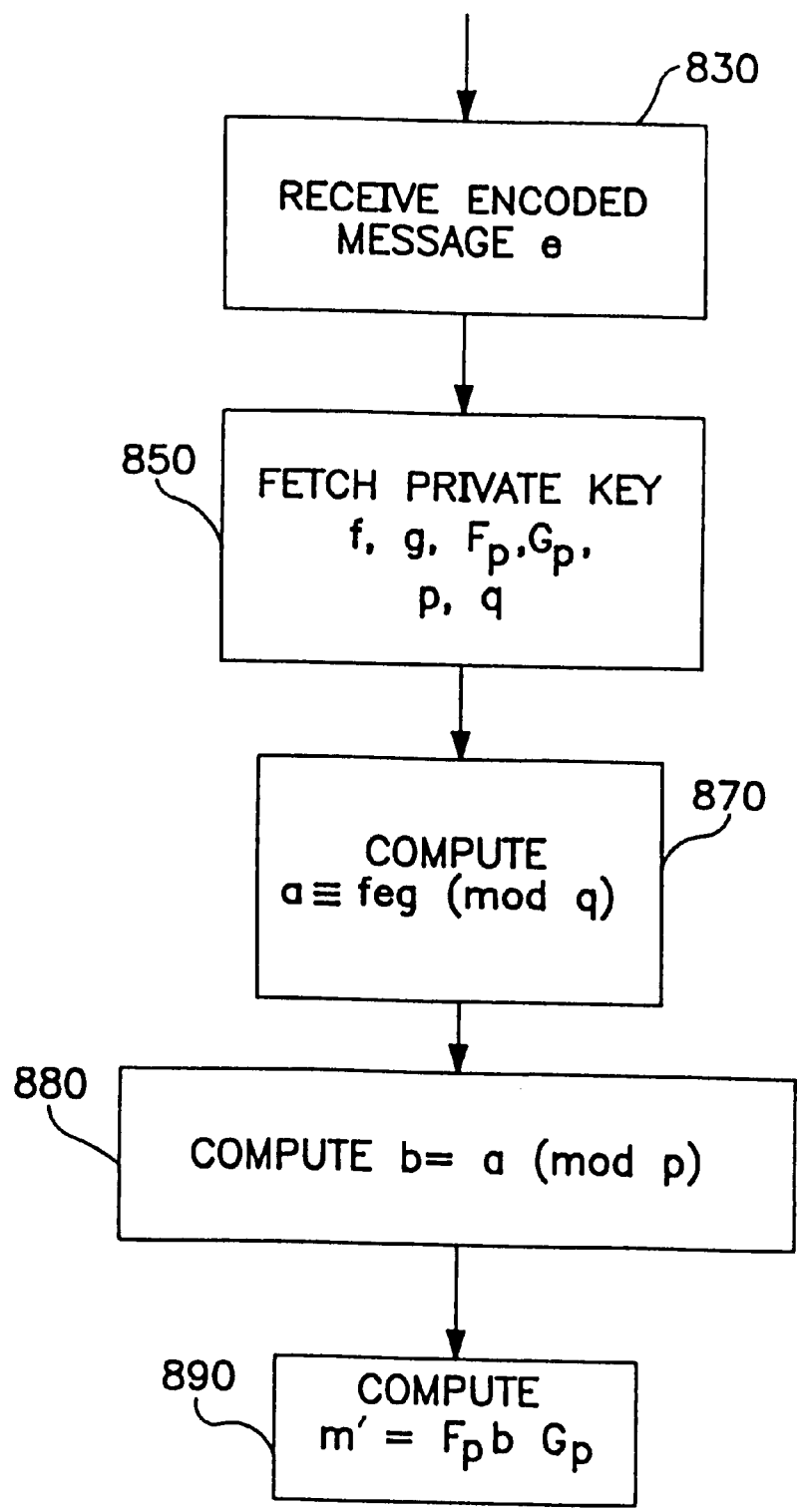
FIG. 8 is a flow diagram in accordance with another embodiment of the invention, for decoding an encoded message using a private key.

FIGS. 6, 7 and 8 are flow diagrams relating to the above-described matrix embodiment. FIG. 6 is a flow diagram of the routine, as represented generally by the block 210 of FIG. 2, for generating the public and private keys. As above, the routine can be utilized, in the present example, for programming the processor 110 of the processor system 105. The block 605 represents the choosing of integer parameters N, p, and q, where N is the number of matrix coefficients, and p and q are relatively prime integers. The block 615 represents the selection of K, which determines the number of matrices. Next, the block 625 represents the choosing of random matrices $f, g, w_1, w_2, \ldots, w_k$, with the requirement that $w_1, w_2, \ldots, w_k$ are all congruent to 0 modulo p. Again, the random number generator 130 (FIG. 1) can be used for this purpose.

The block 640 represents determination of the previously defined matrices $F_p$, $F_q$, $G_p$ and $G_q$. If these matrices do not exist, the block 625 is re-entered, and new matrices f and g are chosen. The loop 630 is continued until matrices are chosen for which the defined inverses can be computed. The block 650 is then entered, this block representing the computation of the public key, a list of K matrices $(h_1, h_2, \ldots, h_k)$ determined by the condition $$h_i = F_q w_i G_q \pmod{q} \text{ for } i=1,2, \ldots K.$$

As represented by the block 660, the private key is retained as the matrices (f, g, $F_p$, $G_p$) and the public key can then be published, as represented by the block 670.

FIG. 7 is a flow diagram, represented generally by the block 240 of FIG. 2, of a routine for programming a processor, such as the processor 160 of the processor system 155 (FIG. 1) to implement encoding of a plaintext message m using the technique of the present matrix embodiment. The message to be encoded is input (block 720) and the random integers $ø_1, ø_2, \ldots, ø_k$ are chosen (block 730). The integers can be selected by the random number generator 185 (FIG. 1). The encoded message, e, can then be computed (block 750) as $$e \equiv \emptyset_1 h_1 + \emptyset_2 h_2 + \ldots + \emptyset_k h_k + m \pmod{q}.$$

The encoded message can be transmitted (block 760) over channel 50, to the keyholder which, in the present example, is the user of the processor system 105.

FIG. 8 is a flow diagram represented generally in FIG. 2 by the block 260, of a routine for decoding the encrypted message in accordance with the present matrix embodiment. The block 830 represents the receiving of the encrypted message, e. The retained private key information, which includes the previously defined F, g, $F_p$ and $G_p$, and the integers N, p, and q, are fetched (block 850). Then, the block 870 represents the computation of $$a \equiv feg \pmod{q}.$$

Next, a is reduced modulo p to b (block 880) as $$b \equiv feg \pmod{q}.$$

The decoded message is then computed (block 890) as $$m' \equiv F_p b G_p \pmod{q}.$$

The invention has been described with reference to particular preferred embodiments, but variations within the spirit and scope of the invention will occur to those skilled in the art. For example, it will be understood that the public or private keys can be stored on any suitable media, for example a "smart card", which can be provided with a microprocessor capable of performing encoding and/or decoding, so that encrypted messages can be communicated to and/or from the smart card.

What is claimed is:

1. A method of communicating information between users of a communications system, the method comprising the steps of:

generating a ring R, ideals P and Q in R, a set of coset representatives $C_Q$ for the ring R modulo the ideal Q, and a set of coset representative $C_P$ for the ring R modulo the ideal P;

generating at least one public key element $h_1, \ldots, h_k$ in the ring R as a function of at least two private key elements $f_1, \ldots f_n$ in R and the ideal Q of the first user; and transmitting from a first user to a second user a description of the ring R, the ideal Q, the ideal P, and the elements $h_1, \ldots, h_k$ in R;

generating an element e in R as a function of the ideals P and Q, the public key elements $h_1, \ldots, h_k$ a private message element m in R, and at least one private random element $\emptyset_1, \ldots, \emptyset_l$ of the second user; and transmitting the element e from the second user to the first user, such that the first user can determine the message element m by computing a result A in R of evaluating a function F of e, $f_1, \ldots, f_n$, computing a coset representative a of A in the set of coset representatives $C_Q$, computing a result B of evaluating a function G of a, $f_1, \ldots, f_n$, computing a coset representative b of B in the set of coset representatives $C_P$, and computing a result c in the set of coset representatives $C_P$ of evaluating a function H of b, $f_1, \ldots, f_n$.

2. The method of claim 1, wherein the message element m satisfies the condition that m is an element of $C_P$.

3. The method of claim 1, wherein the first user determines the message element m by computing a function of a, b, c, $f_1, \ldots f_n$.

4. The method of claim 1, wherein the public key elements $h_1, \ldots, h_k$ satisfy the condition that the element $f_i$ is congruent in R to the product $h_i f_{k+1}$ modulo the ideal Q for each i between 1 and k.

5. The method of claim 1, wherein the private key elements $f_1, \ldots, f_{k+1}$ satisfy the condition that the elements $f_1, \ldots, f_k$ are in the ideal P.

6. The method of claim 1, wherein the private random elements $\emptyset_1, \ldots \emptyset_l$ are in the ideal P.

7. The method of claim 1, wherein the element e generated as a function of the public key elements $h_1, \ldots h_k$, the private random elements $\emptyset_1, \ldots, \emptyset_{k+1}$, and the private message element m is generated as an element of $C_Q$ which is congruent to $\emptyset_1 h_1 + \emptyset_2 h_2 + \ldots + \emptyset_k h_k + \emptyset_k + m$ modulo the ideal Q.

8. The method of claim 1, wherein the result A of evaluating the function F of e, $f_1, \ldots f_n$ is the product $ef_{k+1}$.

9. The method of claim 1, wherein the result B of evaluating the function G of a, $f_1, \ldots f_n$ is the element a.

10. The method of claim 1, wherein the result c in the set of coset representatives $C_P$ of evaluating the function H of a, $\emptyset_1, \ldots f_n$ satisfies the condition $cf_{k+1}$ is congruent to b modulo the ideal P.

11. The method of claim 1, wherein the result c is equal to the coset representatives of the message m in the set of coset representatives $C_P$.

12. The method of claim 1, wherein the ring R is a ring of polynomials in one variable X modulo the ideal of R generated by a monic polynomial M(X) of degree N, wherein the ideal Q of R is the ideal generated by an integer q, the ideal P of R is the ideal generated by an integer p, the set of coset representatives $C_Q$ is the set of polynomials of degree at most N–1 in R with coefficients in a fixed set of coset representatives modulo q, and wherein the set of coset representatives $C_P$ is the set of polynomials of degree at most N–1 in R with coefficients in a fixed set of coset representatives modulo p.

13. The method of claim 12, wherein the private key elements $f_1, \ldots f_n$, the private message element m in R, and the private random elements $\emptyset_1, \ldots, \emptyset_l$ satisfy conditions that include bounds on their coefficients.

14. The method of claim 1, wherein the ring R is non-commutative.

15. The method of claim 14, wherein the element e generated as a function of the public key elements $h_1, \ldots h_k$, the private random elements $\emptyset_1, \ldots, \emptyset_{2k+1}$, and the private message element m is generated as an element of $C_Q$ which is congruent to $\emptyset_1 h_1 \emptyset_{k+1} \emptyset_2 h_2 \emptyset_{k+2} + \ldots + \emptyset_k h_k \emptyset_{2k} + \emptyset_{2k+1} + m$ modulo the ideal Q.

16. The method of claim 1, wherein the elements $h_1, \ldots h_k$ are generated in $C_Q$ according to the condition that the element $f_{k+1} h_i f_{k+2}$ is congruent in R to $f_i$ modulo the ideal Q for each i between 1 and k.

17. The method of claim 1, wherein the private key elements $f_1, \ldots, f_k$ are in the ideal P.

18. The method of claim 1, wherein the private random elements $\emptyset_1, \ldots, \emptyset_{2k+1}$ satisfy the condition that the elements $\emptyset_1, \ldots, \emptyset_k$ are in the ideal P.

19. The method of claim 1, wherein the ring R is a ring of matrices with integer coefficients, the ideal Q of R is the ideal consisting of all matrices divisible by a fixed integer q, the ideal P of R is the ideal consisting of all matrices divisible by a fixed integer p, that the set of coset representatives $C_Q$ is the set of elements of R with coefficients in a fixed set of coset representatives modulo q, and that the set of coset representatives $C_P$ is the set of elements of R with coefficients in a fixed set of coset representatives modulo p.

20. The method of claim 19, wherein the private key elements $f_1, \ldots, f_n$, the private message element m, and the private random elements $\phi_1, \ldots, \phi_l$ satisfy conditions that include bounds on their coefficients.

21. The method of claim 19, wherein the private random elements $\phi_1, \ldots, \phi_l$ satisfy the condition that $\phi_1, \ldots, \phi_l$ are constant multiples of the identity matrix.

22. The method of claim 1, wherein the ring R is a group ring of a group $\Gamma$, the ideal Q of R is the ideal generated by an integer q, the ideal P of R is the ideal generated by an integer p, the set of coset representatives $C_Q$ is the set of elements of R with coefficients in a fixed set of coset representatives modulo q, and that the set of coset representatives $C_P$ is the set of elements of R with coefficients in a fixed set of coset representatives modulo p.

23. The method of claim 22, wherein the private key elements $f_1, \ldots, f_n$, the private message element m, and the private random elements $\phi_1, \ldots, \phi_l$ satisfy conditions that include bounds on their coefficients.

24. The method of claim 1, wherein the ring R is a non-commutative ring of polynomials in two variables X and Y subject to the dihedral relations $X^N=1$, $Y^2=1$, and $XY=YX^{N-1}$, the ideal Q of R is the ideal generated by an integer q, the ideal P of R is the ideal generated by an integer p, the set of coset representatives $C_Q$ is the set of polynomials in R of degree at most N−1 in the variable X with coefficients chosen from a set of coset representatives modulo q, and wherein the set of coset representatives $C_P$ is the set of polynomials in R of degree at most N−1 in the variable X with coefficients chosen from a fixed set of coset representatives modulo p.

25. The method of claim 24, wherein the private key elements $f_1, \ldots, f_n$, the private message element m, and the private random elements $\phi_1, \ldots, \phi_l$ satisfy conditions that include the condition that some of them lie in the commutative subring $R_0$ of R consisting of all elements $\psi$ of R which satisfy the condition $Y\psi=\psi Y$.

* * * * *